United States Patent
Kamiyama

(10) Patent No.: US 10,190,721 B2
(45) Date of Patent: Jan. 29, 2019

(54) POSITION ADJUSTING SPACER AND METHOD FOR ADJUSTING THE POSITION OF A REHABILITATION PIPE USING SUCH

(71) Applicant: SHONAN GOSEI-JUSHI SEISAKUSHO K.K., Kanagawa (JP)

(72) Inventor: Takao Kamiyama, Kanagawa (JP)

(73) Assignee: SHONAN GOSEI-JUSHI SEISAKUSHO K.K. (JP)

( * ) Notice: Subject to any disclaimer, the term of this patent is extended or adjusted under 35 U.S.C. 154(b) by 258 days.

(21) Appl. No.: 15/072,514

(22) Filed: Mar. 17, 2016

(65) Prior Publication Data
US 2016/0273699 A1 Sep. 22, 2016

(30) Foreign Application Priority Data

Mar. 20, 2015 (JP) .................. 2015-058452

(51) Int. Cl.
*F16L 55/18* (2006.01)
*F16L 55/165* (2006.01)

(52) U.S. Cl.
CPC ........... *F16L 55/18* (2013.01); *F16L 55/1657* (2013.01)

(58) Field of Classification Search
CPC .............................. F16L 55/18; F16L 55/1657
USPC ............................................. 138/98, 97, 99
See application file for complete search history.

(56) References Cited

U.S. PATENT DOCUMENTS

| 184,791 A | * | 11/1876 | McConnell | ......... F16L 55/1651 138/98 |
| 321,565 A | | 7/1885 | Young | |
| 1,075,842 A | * | 10/1913 | McCutchen | .......... E21B 33/134 138/89 |
| 1,452,777 A | | 4/1973 | Band | |
| 4,498,811 A | * | 2/1985 | Fern | ..................... F16L 55/1283 138/89 |

(Continued)

FOREIGN PATENT DOCUMENTS

JP      4392275      12/2009

OTHER PUBLICATIONS

European Search Report dated Sep. 2, 2016 issued in Application No. EP 16 15 9462.

*Primary Examiner* — David Bochna
(74) *Attorney, Agent, or Firm* — Adams & Wilks

(57) ABSTRACT

A spacer is inserted in a gap between an existing pipe and a rehabilitation pipe to adjust the position of the rehabilitation pipe inside the existing pipe. The spacer comprises first and second wedge-shaped members each having an inclined surface of the same inclination angle and being overlapped with the inclined surfaces thereof overlapped. Latching teeth are formed in the inclined surfaces of the first and second wedge-shaped members so that the second wedge-shaped member is movable relative to the first wedge-shaped member in the insertion direction of the spacer to stepwise increase an overall height thereof, but immovable in the reverse direction. Either one of the first and second wedge-shaped members is provided at the engaging teeth portions with an elastic deformable member that can be elastically deformed to disengage the latching teeth of the first and second wedge-shaped members to enable movement of the second wedge-shaped member in the reverse direction for re-adjustment of the position of the rehabilitation pipe inside the existing pipe.

4 Claims, 16 Drawing Sheets

(56) References Cited

U.S. PATENT DOCUMENTS 7,451,783 B2    11/2008    Kamiyama et al. ............ 138/98
9,746,121 B2 *   8/2017    Kamiyama ......... F16L 55/1657

* cited by examiner

POSITION ADJUSTING SPACER AND METHOD FOR ADJUSTING THE POSITION OF A REHABILITATION PIPE USING SUCH

BACKGROUND OF THE INVENTION

Field of the Invention

The present invention relates to a spacer inserted in a gap between an existing pipe and a rehabilitation pipe to adjust the position of the rehabilitation pipe, and a method for adjusting the position of a rehabilitation pipe using such a spacer.

Description of the Related Art

A method for rehabilitating an existing pipe such as a sewer pipe is known in which a rehabilitation pipe is laid inside the existing pipe and a compound pipe is constructed by filling the gap between the outer periphery of the rehabilitation pipe and the inner wall surface of the existing pipe with a filler. This existing pipe rehabilitating work normally requires the fixing of the rehabilitation pipe by adjusting the position of the rehabilitation pipe in the upper, lower, left, and right directions inside the existing pipe to a position slightly offset downward from the position concentric with the existing pipe so that the lower end of the outer periphery thereof contacts the bottom of the existing pipe.

The purpose of this is to ensure the flow of fluid inside the existing pipe by lowering the bottom of the rehabilitation pipe so that it approaches the bottom of the existing pipe as much as possible, and to thicken and strengthen the filler on the upper side because the majority of damage to existing pipes occurs on the upper side portion thereof. In this connection, the abovementioned position adjustment is needed in order to press the rehabilitation pipe downward because the rehabilitation pipe is made of a plastic material having a specific gravity lower than the filler, and therefore unfortunately floats above the filler.

To adjust the position of a rehabilitation pipe, a spacer is inserted in the gap between the rehabilitation pipe outer periphery and the existing pipe inner wall surface. For example, Japanese Patent No. 4392275 discloses a spacer comprising two wedge-shaped members each having an inclined surface of the same inclination angle and being overlapped with the inclined surfaces aligned with each other. The one wedge-shaped member is movable relative to the other in an insertion direction to stepwise increase an overall height of the spacer, but immovable in a reverse direction opposite the insertion direction. With such a construction, the movable wedge-shaped member is latched in the reverse direction, so that once the overall height of the spacer has been adjusted to a given height, it becomes difficult to move the wedge-shaped member in the reverse direction and re-adjust the height of the spacer to a position lower than the given height.

An object of the present invention is therefore to provide a position adjusting spacer that can shortly and appropriately re-adjust the position of a rehabilitation pipe inside an existing pipe during existing pipe rehabilitating work, and also to provide a position adjusting method that utilizes such a spacer.

SUMMARY OF THE INVENTION

A spacer according to the present invention is inserted in a gap between an existing pipe and a rehabilitation pipe to adjust the position of the rehabilitation pipe inside the existing pipe. The spacer comprises a first wedge-shaped member having a surface inclined at a prescribed angle; a second wedge-shaped member having a surface inclined at an angle the same as the inclination angle of the first wedge-shaped member, the inclined surface of the second wedge-shaped member being aligned with and overlapping the inclined surface of the first wedge-shaped member; a latching means for making the second wedge-shaped member movable relative to the first wedge-shaped member in an insertion direction to stepwise increase an overall height of the spacer in the gap between the existing pipe and the rehabilitation pipe and for latching the first and second wedge-shaped members to each other at any of a plurality of latch positions to avoid movement of the second wedge-shaped member in a reverse direction opposite the insertion direction; and an unlatch means for unlatching the first and second wedge-shaped members to enable movement of the second wedge-shaped member relative to the first wedge-shaped member in the reverse direction.

In the invention, latching teeth are formed at a prescribed pitch in the inclined surface of the first wedge-shaped member, and latching teeth that engage with the latching teeth of the first wedge-shaped member are formed in the inclined surface of the second wedge-shaped member at a pitch the same as or different from the prescribed pitch. The first and second wedge-shaped members are latched or unlatched to each other by mutual engagement or disengagement of the latching teeth thereof. Either one of the first and second wedge-shaped members is provided at the engaging teeth portions with an elastic deformable member that can be elastically deformed to disengage the latching teeth of the first and second wedge-shaped members. The elastic deformable member thus constitutes the unlatching means.

A method for adjusting the position of a rehabilitation pipe according to the invention utilizes such a spacer comprising the first and second wedge-shaped members. The first and second wedge-shaped members are overlapped for insertion in the spacer in the gap between the existing pipe and the rehabilitation pipe, and the second wedge-shaped member is pressed in the insertion direction to move it relative to the first wedge-shaped member to stepwise increase the overall height of the spacer. The second wedge-shaped member is unlatched to enable reverse movement for positional re-adjustment of the overall height of the spacer.

According to the present invention, the position of a rehabilitation pipe inside an existing pipe can be re-adjusted shortly and appropriately during existing pipe rehabilitating work.

DESCRIPTION OF THE PREFERRED EMBODIMENTS

The present invention will now be described with references to embodiments illustrated in the accompanying drawings. The present invention is suitable for rehabilitating or repairing sewage pipes, water supply pipes, tunnels, agricultural irrigation channels, and other existing large-diameter pipes. In the present embodiment, the rehabilitation pipes are described as having a circular cross-section profile orthogonal to the pipe-length direction. However, it shall be apparent that the present invention can be applied to a rehabilitation pipe having a square or another non-circular cross-section. Also, in addition to structures in which the cross-section profile is closed as a pipe, a structure having a horseshoe-shaped, semi-circular, U-shaped, or another cross-section profile in which one side is open can also be considered to be a pipe, and the present invention can also be applied thereto.

Figure 1:
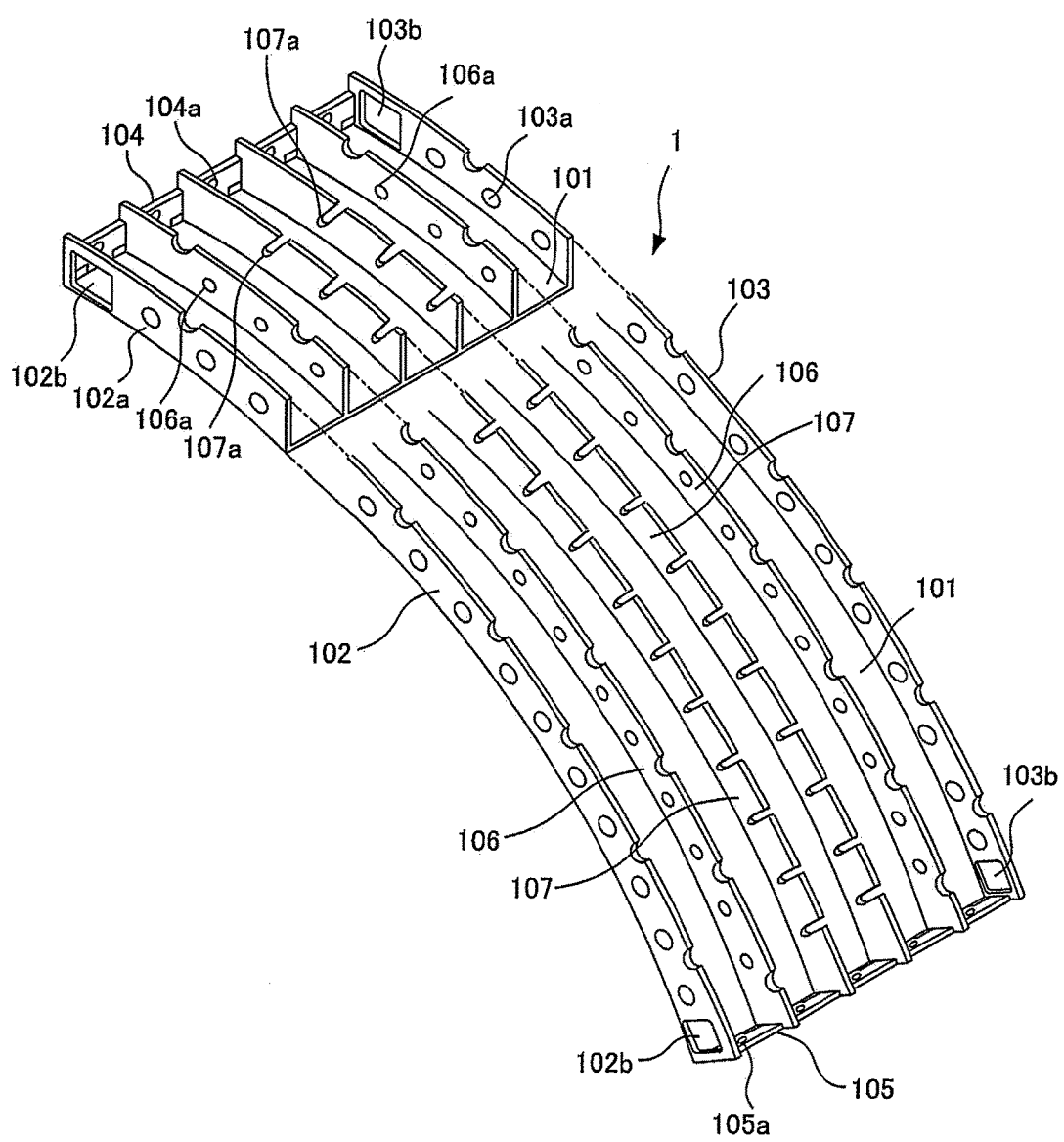
FIG. 1 is a perspective view showing the structure of a segment used in assembling the rehabilitation pipe.

FIG. 1 shows the structure of a segment 1 for pipe rehabilitation (hereafter simply referred to as "segment"), which represents an assembly unit member of a rehabilitation pipe for rehabilitating an existing pipe. The segment 1 is an integrally formed block-shaped member made from a plastic material, comprising an inner surface plate 101 constituting an inner circumferential surface of the rehabilitation pipe, side plates 102, 103 provided vertically upright on both sides extending in the circumferential direction of the inner surface plate 101, and end plates 104, 105 provided vertically upright on both ends extending in the pipe-length direction of the inner surface plate 101.

In the present embodiment, the segment 1 has a shape that is curved as an arc representing a predetermined angle that equally divides the circumference, e.g., a 60° arc that divides the circumference into sixths. However, the segment is not limited to that having an arc or a fan shape.

A plurality of inner plates 106, 107 having a shape similar to that of the side plates are provided upright at equal intervals and parallel to the side plates 102, 103 in order to reinforce the mechanical strength of the segment 1.

A plurality of holes 102a and 103a for admitting insertion of a liking member and a nut for linking the segment 1 in the pipe-length direction are provided at equal intervals along the circumference on the side plates 102 and 103. The holes 102a and 103a are located at coinciding positions along the circumferential direction.

The side plates 102, 103 are provided at both ends in the circumferential direction with openings 102b and 103b that are used for a linking operation of the segments in the circumferential direction.

The end plates 104 and 105 are disposed between the side plate 102 and the side plate 103 and are provide with circular insertion holes 104a, 105a for admitting insertion of a bolt or another linking member for linking the segments in the circumferential direction.

The inner plate 106 is provided at equal intervals with circular insertion holes 106a for admitting insertion of linking members for linking the segments in the pipe-length direction. The inner plate 107 is also provided with a plurality of notches 107a to admit insertion of the linking members in the pipe-length direction. The positions of the insertion holes 106a and the notches 107a in the circumferential direction coincide with those of the holes 102a, 103a of the side plates 102, 103.

The inner surface plate 101, the side plates 102, 103, the end plates 104, 105, and the inner plates 106, 107 are all made from an identical transparent, semi-transparent or opaque plastic material, and are integrally formed using a known molding technique.

Figure 2A:
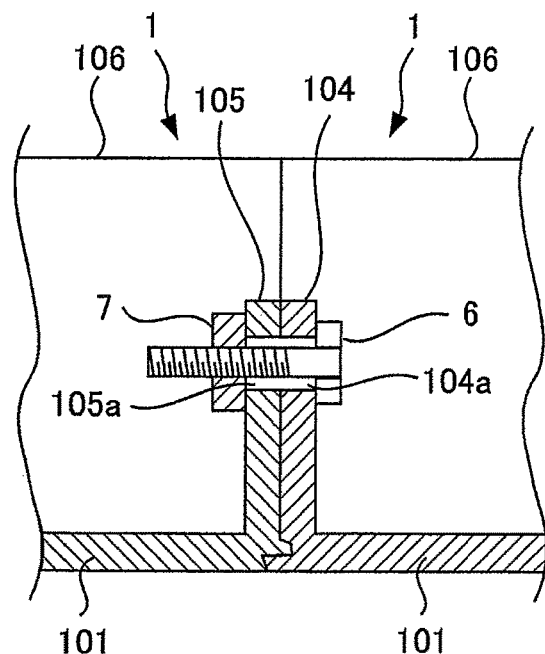
FIG. 2*a* is a cross-sectional view of segments that are linked in the circumferential direction.
Figure 2B:
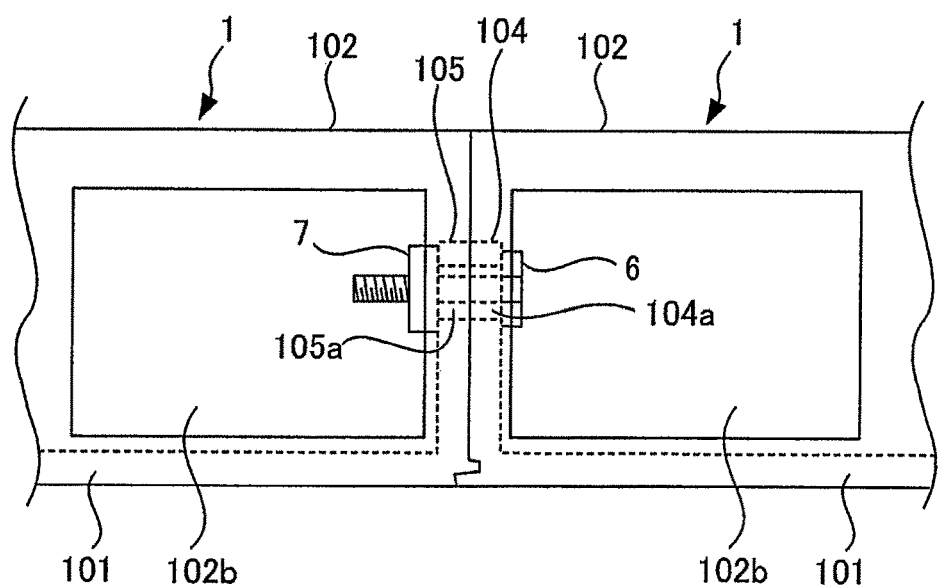
FIG. 2*b* is a front view thereof.
Figure 3:
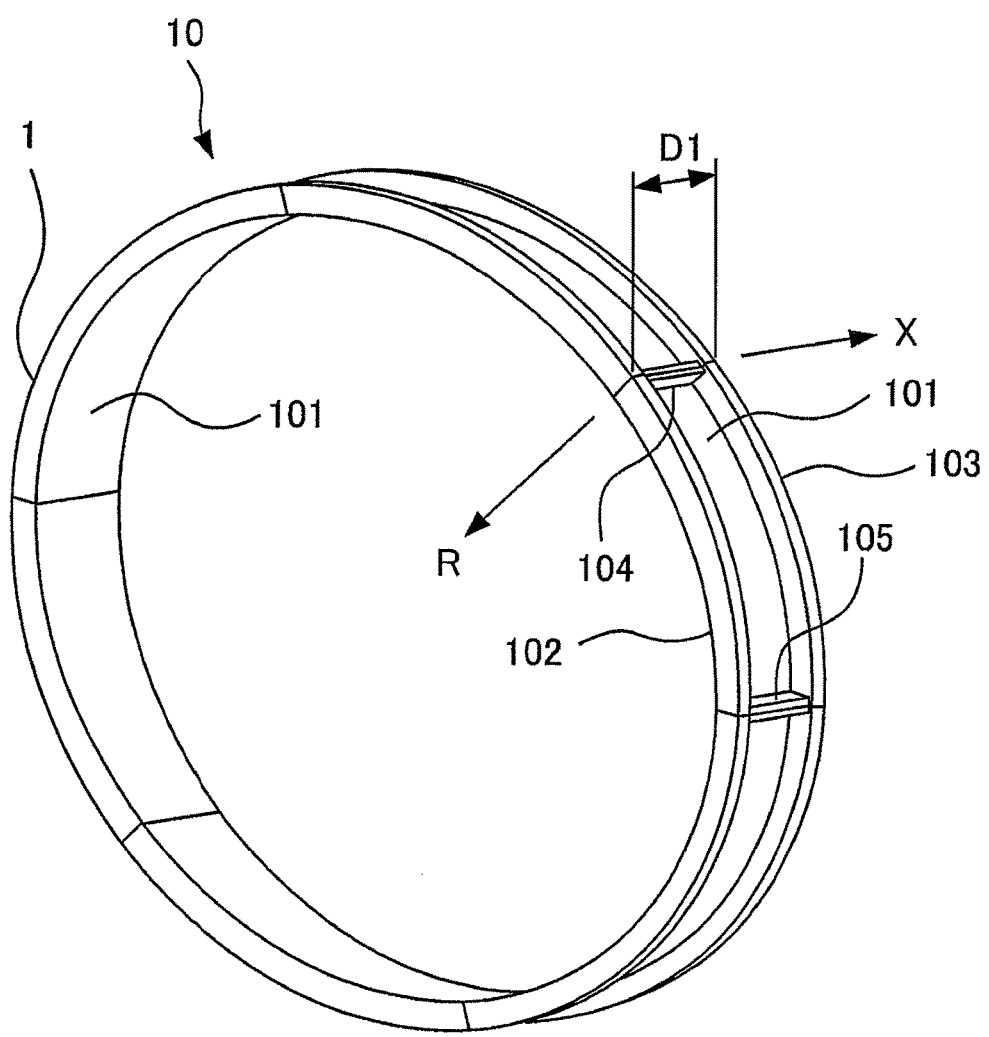
FIG. 3 is a perspective view showing a state in which the segments are linked in the circumferential direction to assemble a pipe unit.

As shown FIGS. 2a and 2b, the segments 1 are linked in the circumferential direction using a bolt 6 and a nut 7, and are, as shown in FIG. 3, linked around the full circumference to assemble a closed ring-shaped short pipe assembly 10 (hereafter referred to as "pipe unit") having a predetermined small length D1 in the pipe-length direction X. The outside diameter of the pipe unit 10 is slightly smaller than the inside diameter of an existing pipe to be rehabilitated.

Figure 4:
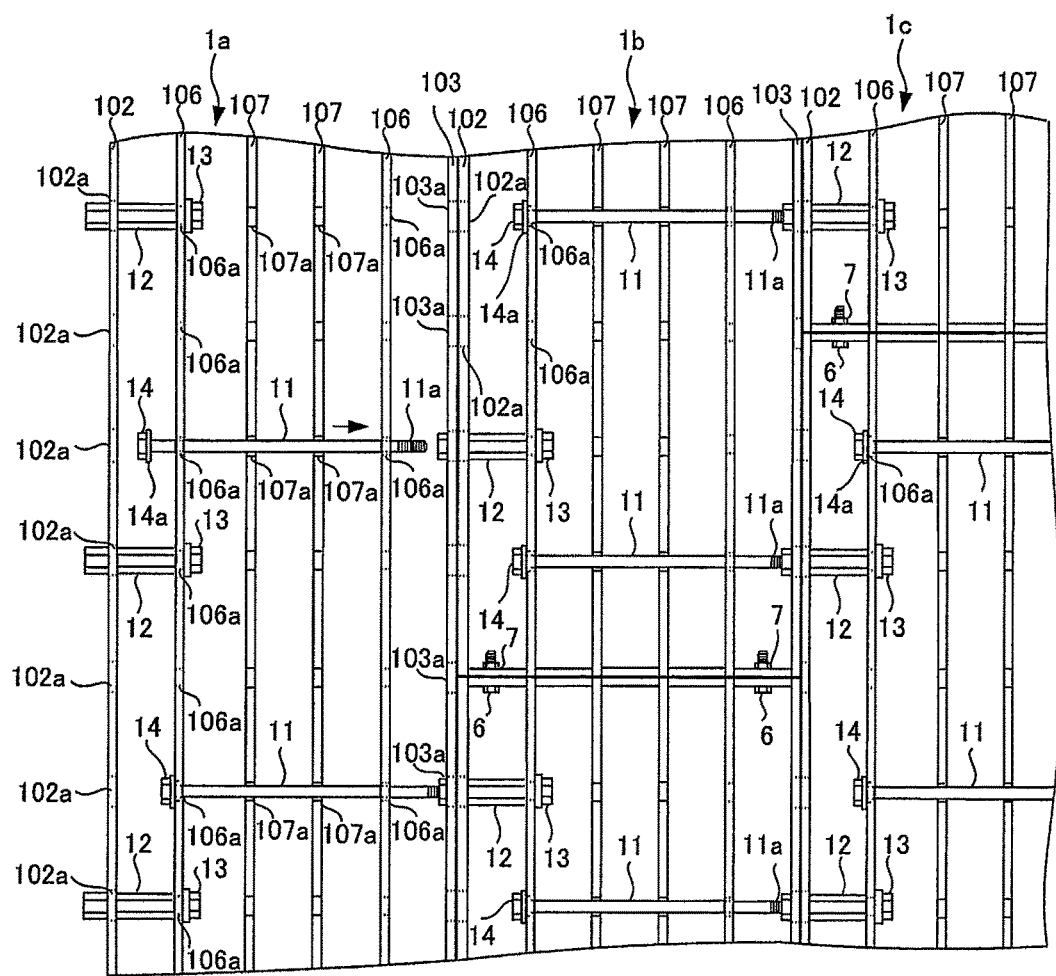
FIG. 4 is a top view showing the segments of the pipe units that are linked in the pipe-length direction using linking members.

Such a pipe unit is linked in the pipe-length direction using a linking member 11 and a nut 12 as shown in FIG. 4. The nut 12 is inserted in FIG. 4 from the insertion hole 102a in the side plate 102 on one side of the segment 1b and is fixed against the inner plate 106 using a bolt 13. The nut 12 is then passed through the hole 103a in the side plate 103 of the other segment 1a, thereby placing the two segments 1a, 1b against each other.

The linking member 11 is then passed through the segment 1a, and a threaded section 11a thereof is threaded into the nut 12 to link the linking member 11 and the nut 12. The linking member 11 is further threaded into the nut 12 until a flange section 14a of a head section 14 presses against the leftmost inner plate 106 of the segment 1a to tighten and fix the two segments 1a, 1b. This makes it possible to link the segments of the pipe units in the pipe-length direction to a desired length.

A description will now be given for a method for rehabilitating an existing pipe using the segments configured as described above.

Figure 5:
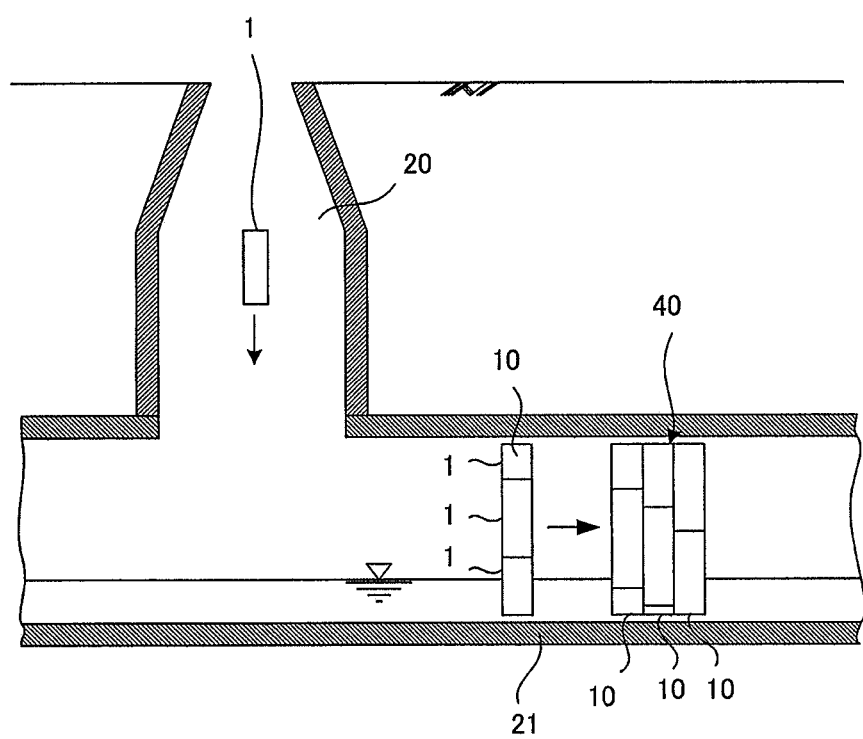
FIG. 5 is an illustrative view showing a state in which the pipe units are linked to install the rehabilitation pipe inside the existing pipe.
Figure 6:
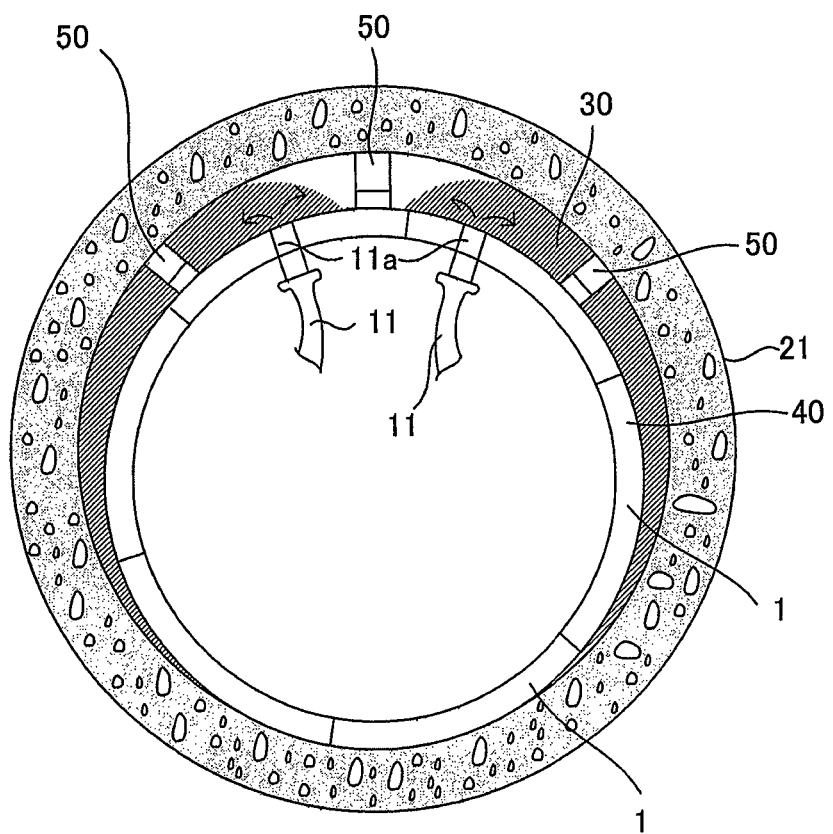
FIG. 6 is a cross-sectional view showing a state in which a filler is injected into the gap between the rehabilitation pipe and the existing pipe.

As shown in FIG. 5, the segment 1 is carried through a manhole 20 into an existing pipe 21, and as shown in FIGS. 2 and 3, the segments are sequentially linked in the circumferential direction to assemble the pipe unit 10. The pipe units 10 are then sequentially linked in the pipe-length direction as shown in FIG. 4 to install a rehabilitation pipe 40 in the existing pipe 21. A filler 30 as shown in FIG. 6 such as grout material is injected into a space between the rehabilitation pipe 40 and the existing pipe 21 to provide a composite pipe comprising the rehabilitation pipe 40, the existing pipe 21 and the filler 30.

The rehabilitation pipe 40 comprises a plastic material and has a low specific gravity and therefore floats on the filler. To press and sink the rehabilitation pipe 40 downward, a spacer 50 as shown in FIG. 6 is inserted at a plurality of locations between the inner wall surface of the existing pipe 21 and the upper side outer periphery of the rehabilitation pipe 40 every time the rehabilitation pipe 40 is assembled to a prescribed length.

Figure 7:
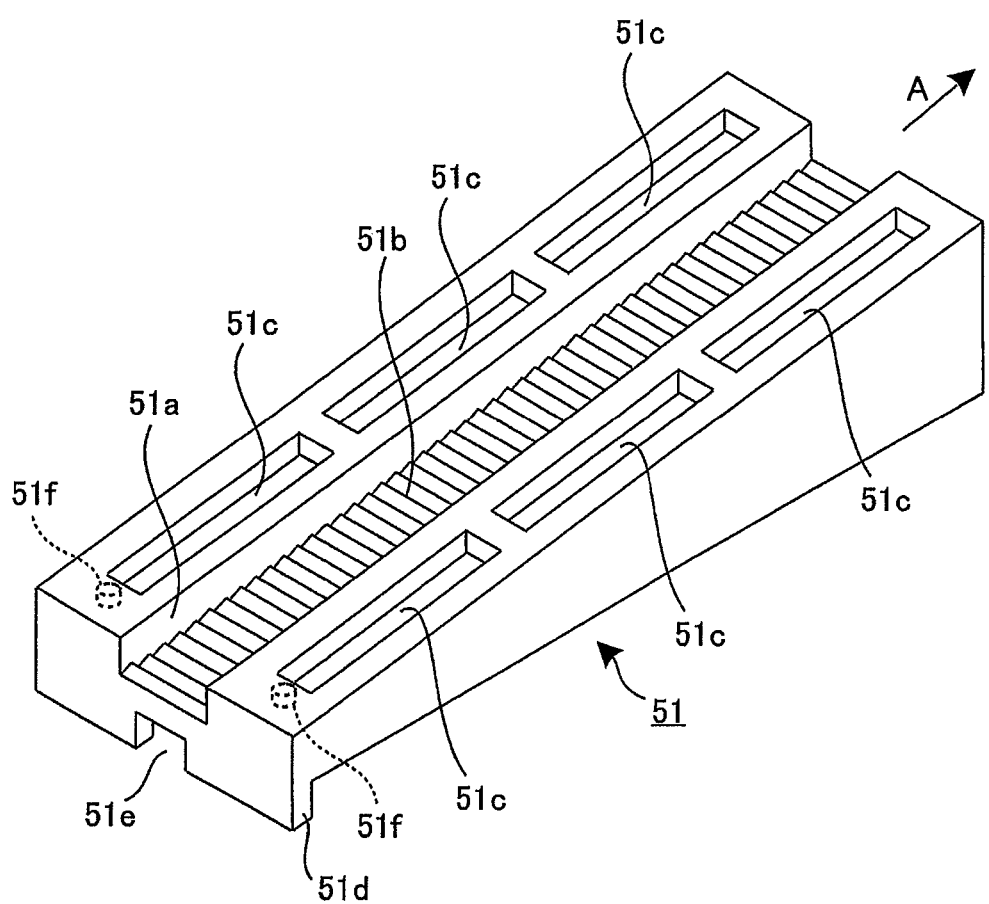
FIG. 7 is a perspective view showing the structure of a first wedge-shaped member that constitutes a spacer.
Figure 8:
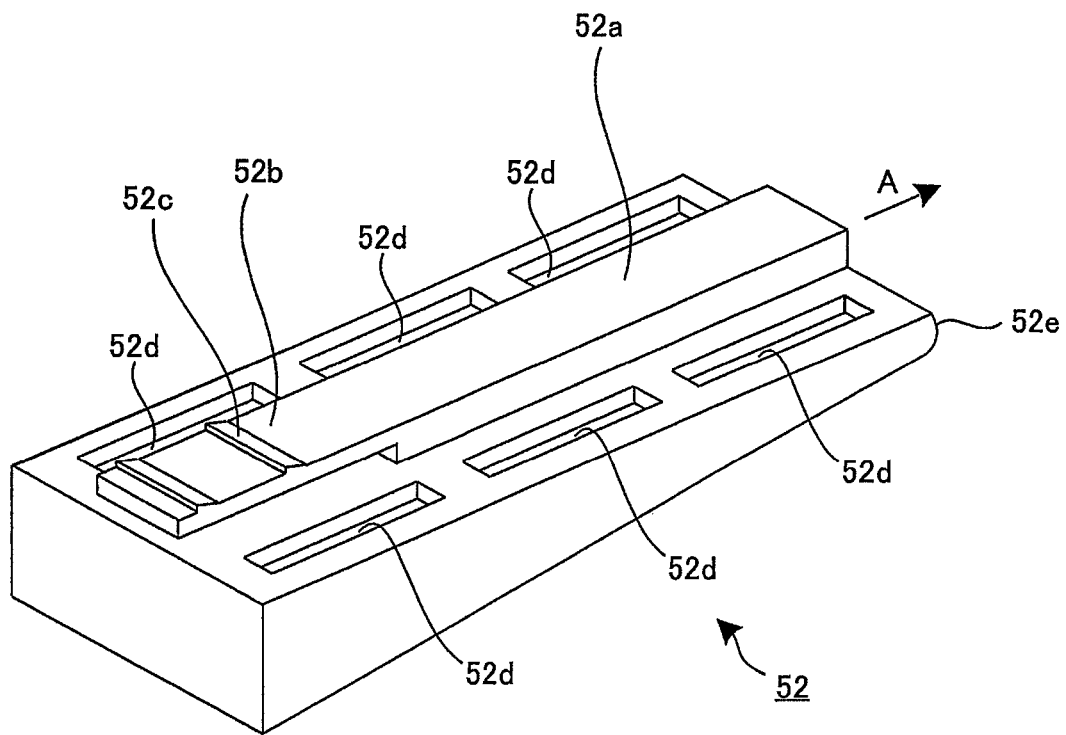
FIG. 8 is a perspective view showing the lower surface side of a second wedge-shaped member that constitutes the spacer.
Figure 9:
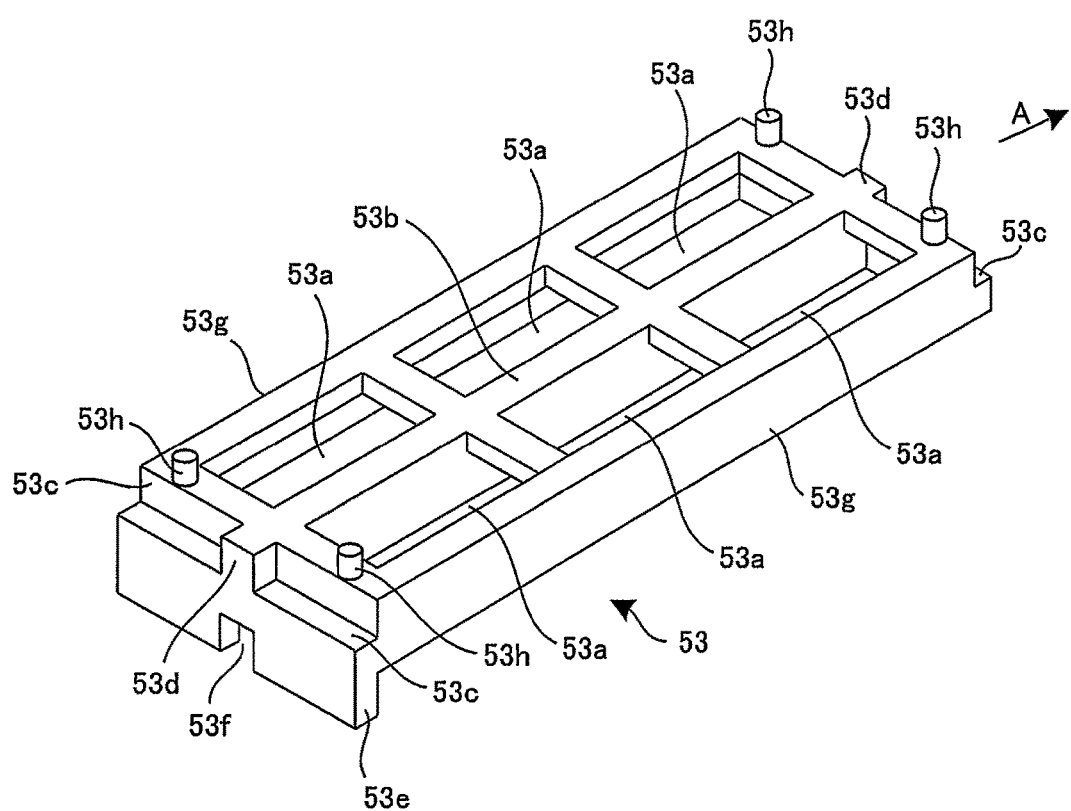
FIG. 9 is a perspective view showing a raising member that constitutes the spacer.
Figure 10:
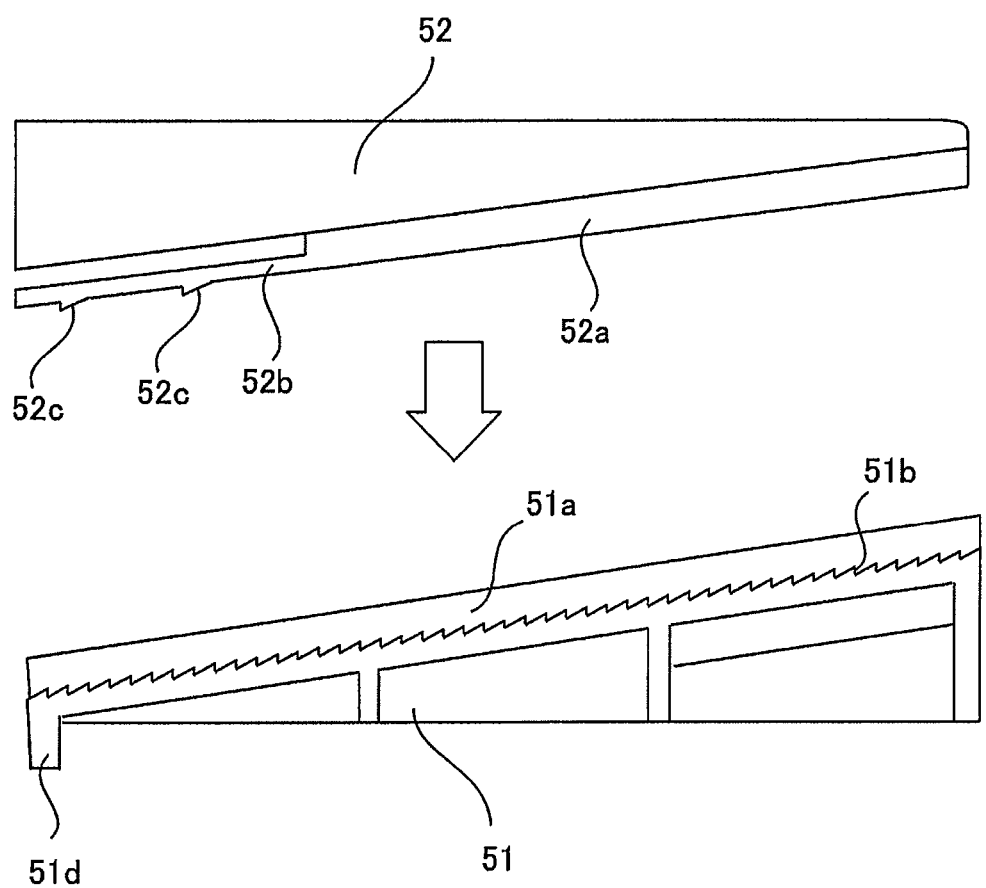
FIG. 10 is an illustrative view showing a state in which the second wedge-shaped member is overlapped on the first wedge-shaped member.
Figure 11A:
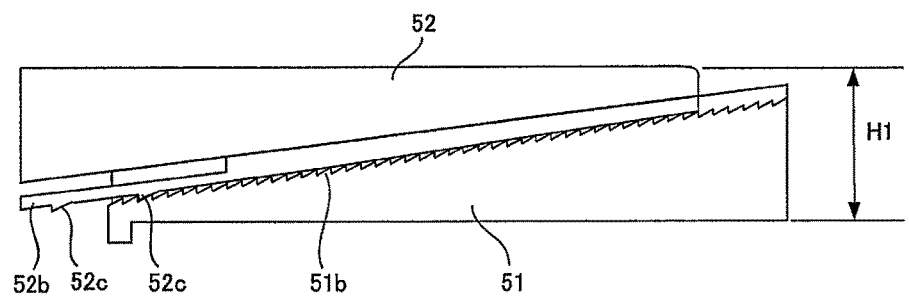
FIG. 11a is an illustrative view showing the spacer with the second wedge-shaped member overlapped on the first wedge-shaped member.
Figure 11B:
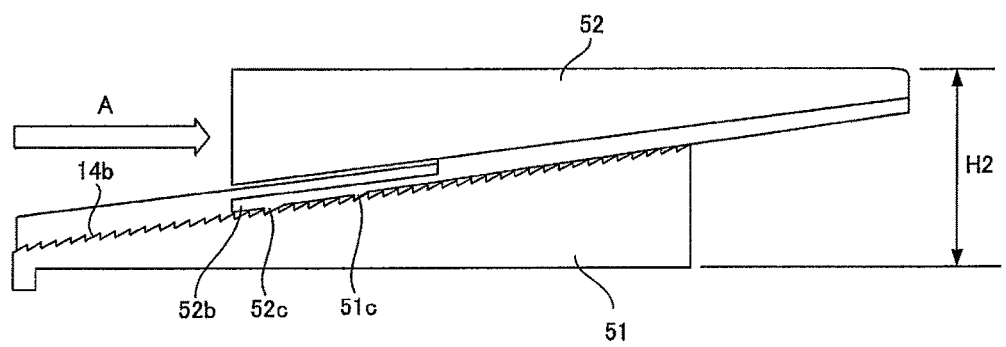
FIG. 11b is an illustrative view showing that the second wedge-shaped member is moved relative to the first wedge-shaped member to increase the overall height of the spacer.

The spacer 50 comprises a first wedge-shaped member 51 as shown in FIG. 7 and a second wedge-shaped member 52 as shown in FIG. 8, and both the wedge-shaped members 51, 52 are overlapped, as shown in FIGS. 10, 11a and 11b. If the height of the spacer 50 is insufficient, a raising member 53 as shown in FIG. 9 is used to increase the height of the spacer. The members 51, 52 and 53 are formed as plastic molded products or metal molded products.

The first wedge-shaped member 51 is inclined so that the upper surface is low on the near side as viewed in the insertion direction A and becomes higher on the far side. The wedge-shaped member 51 has a guide groove 51a at the center part and numerous serrated latching teeth 51b on the bottom surface thereof. Each latching tooth 51b is triangular in cross-section, having an inclined side and a perpendicular side (refer also to FIG. 10, FIGS. 11a and 11b).

The wedge-shaped member 51 has further on both sides long holes 51c along the guide groove 51a and has at the lower end part a foot 51d with a notch 51e formed at the center part thereof. The wedge-shaped member 51 is further provided with openings 51f each receiving a protrusion 53h of the raising member 53 (FIG. 9).

The second wedge-shaped member 52 is shown in FIG. 8 with its vertical orientation inverted, having the same length and width as the first wedge-shaped member 51. The lower surface of the second wedge-shaped member 52 is inclined at the same angle as the upper surface of the first wedge-shaped member 51.

The wedge-shaped member 52 has at the center part a protruding part 52a that extends linearly in the longitudinal direction and fits into the guide groove 51a of the wedge-shaped member 51. The protruding part 52a is formed thinner at one end so as to be elastically deformable, so that the one end thereof can be elastically deformed toward the lower surface of the wedge-shaped member 52, thus forming an elastic deformable member 52b.

The elastic deformable member 52b is provided at the lower surface thereof with a plurality of latching teeth 52c (two in FIG. 8) at integer multiples of the pitch of the latching teeth 51b of the wedge-shaped member 51. The cross-sectional shape of each latching tooth 52c is a triangle corresponding to each latching tooth 51b, but in the reverse orientation. The triangle side formed on the far side is inclined, while the triangle side formed on the near side is perpendicular. The width of the protruding part 52a is slightly less than that of the guide groove 51a of the wedge-shaped member 51, and the height (projection amount) of the protruding part 52a corresponds to the depth of the guide groove 51a.

The wedge-shaped member 52 further has long holes 52d on both sides along the protruding part 52a, and is rounded at the tip part 52e thereof for easier insertion.

FIG. 9 shows the raising member 53 that includes six large rectangular holes 53a partitioned by a partition wall 53b, steps 53c, protruding parts 53d, a foot 53e with a notched part 53f, walls 53g having a prescribed height H3 (refer to FIG. 13a), and four protrusions 53h.

As shown in FIG. 10, the protruding part 52a of the wedge-shaped member 52 is fitted to the guide groove 51a of the wedge-shaped member 51 so that both the wedge-shaped members 51, 52 overlap and the upper surface of the wedge-shaped member 52 and the lower surface of the wedge-shaped member 51 are parallel as shown in FIG. 11a. The protruding part 52a is slidably fitted to the groove 51a, so that the wedge-shaped member 52 is prevented from slipping in the width direction, or dropping.

When the wedge-shaped members 51, 52 overlap, the latching teeth 52c of the wedge-shaped member 52 respectively engage with any of the numerous latching teeth 51b of the wedge-shaped member 51. When the wedge-shaped member 52 is pressed in the insertion direction A as shown by the arrow A in FIG. 11b, the latching teeth 52c ride over the latching teeth 51b due to the shape of the mutually engaged latching teeth 51b and 52c. This enables the wedge-shaped member 52 to move relative to the wedge-shaped member 51. However, it is not movable in the opposite direction because both the latching teeth 51b and 52c engage with each other.

Such a structure enables the wedge-shaped member 52 to be successively moved relative to the wedge-shaped member 51 at a pitch corresponding to the pitch of the latching teeth 51b and latch it at latched positions so that it cannot move in the insertion direction or in the reverse direction.

By successively moving the wedge-shaped member 52 in the direction A, the overall height of the wedge-shaped members 51 and 52 can be set stepwise to a desired height at a pitch corresponding to the pitch of the latching teeth 51b (e.g., a pitch smaller than 1 mm). FIG. 11a shows a first position in which the spacer has an overall height H1, and FIG. 11b shows a second position in which the spacer has an overall height H2.

Figure 12:
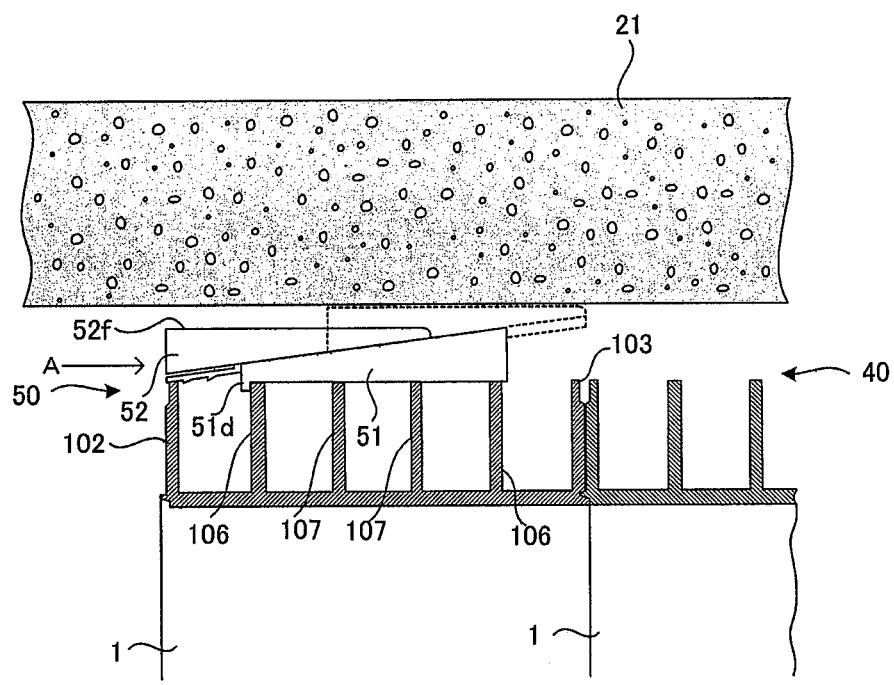
FIG. 12 is an illustrative view showing a state in which the position of the rehabilitation pipe is adjusted using the spacer.

The spacer 50 with the wedge-shaped members 51 and 52 overlapped is inserted into the gap between the inner wall surface of the existing pipe 21 and the outer periphery of the rehabilitation pipe 40. The foot 51d of the wedge-shaped member 51 is engaged to the inner plate 106 of the segment 1 for fixation to the segment 1, as shown in FIG. 12. The wedge-shaped member 52 is then pressed and moved in the direction A relative to the wedge-shaped member 51. This causes the overall height of the spacer 50 to be stepwise successively increased at an extremely small pitch to a desired height, as indicated by the broken line. The overlapping surfaces of the wedge-shaped members 51, 52 are inclined at the same angle and the upper surface 52f of the wedge-shaped member 52 is horizontal. This enables the spacer 50 to stably contact the inner wall surface of the existing pipe 21 and to be stably interposed between the existing pipe 21 and the rehabilitation pipe 40.

Figure 13A:
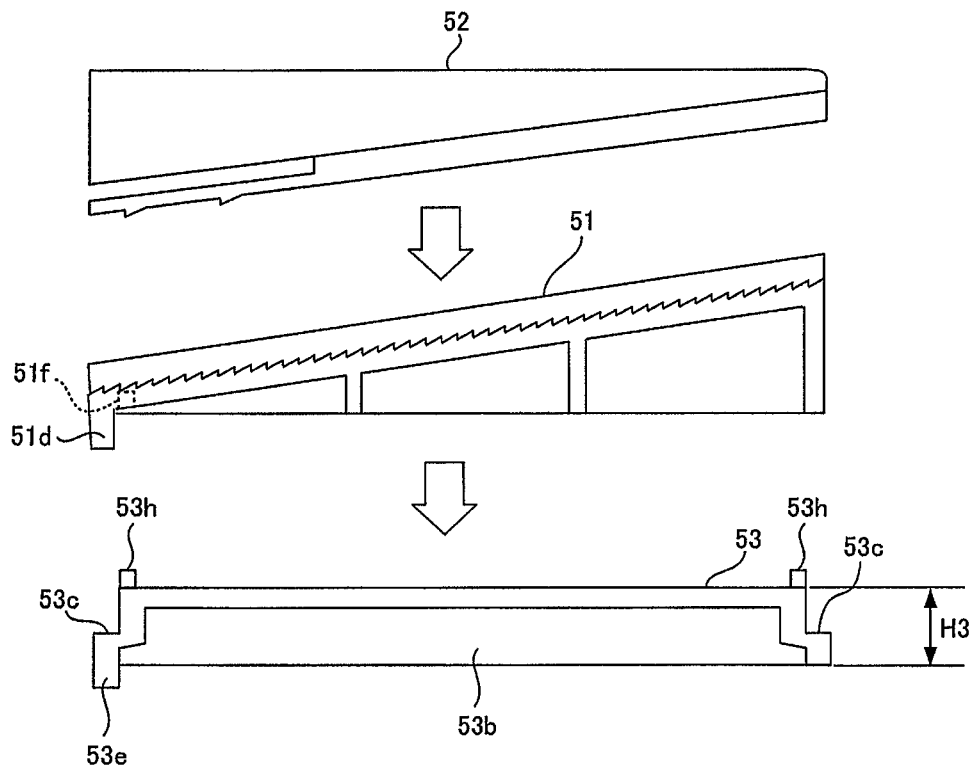
FIG. 13a is an illustrative view showing a state in which the first and second wedge-shaped members and the raising member overlap.
Figure 13B:
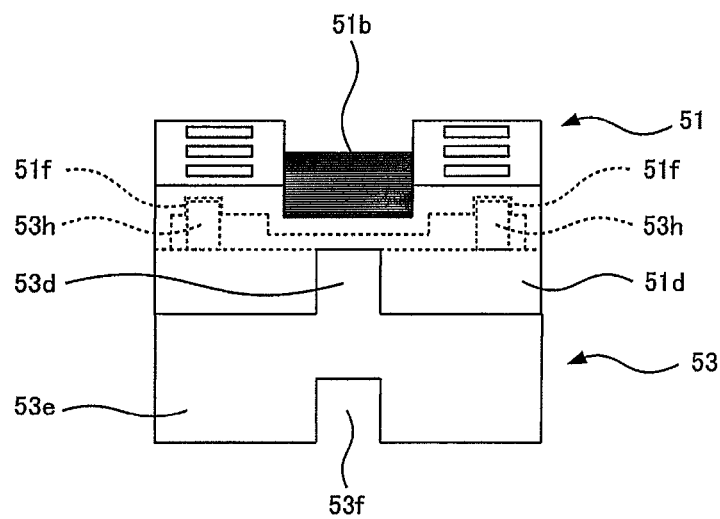
FIG. 13b is a front view showing the first and second wedge-shaped members overlapped on the raising member.
Figure 14:
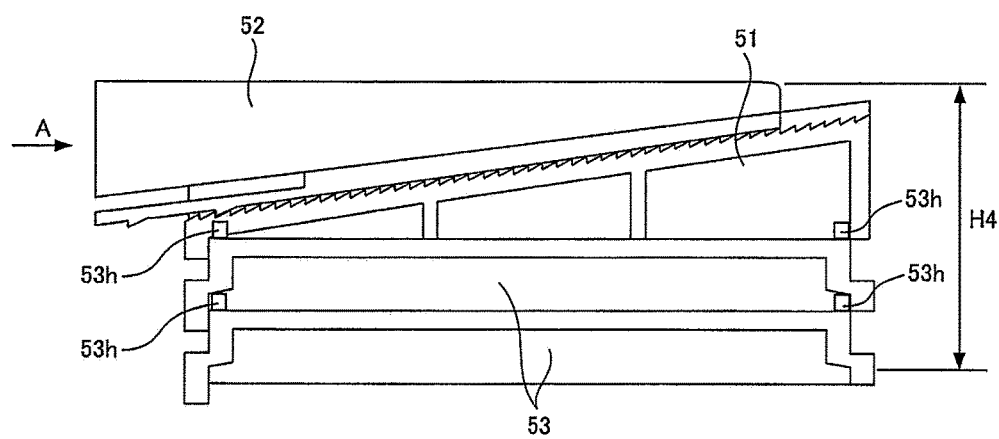
FIG. 14 is a front view showing a spacer comprising the first and second wedge-shaped members and two raising members.

In a case where the dimension of the abovementioned gap is greater than the maximum overall height of the spacer, the raising member 53 is, as shown in FIGS. 13a and 13b, overlapped on the wedge-shaped member 51 to increase the overall height by H3. In this state, the foot 51d and the notched part 51e of the wedge-shaped member 51 are engaged with the step 53c and the protruding part 53d of the raising member 53, and the protrusions 53h of the raising member 53 are fitted into the openings 51f of the wedge-shaped member 51, as shown in FIG. 13b. As shown in FIG. 14, the two raising members 53 may be overlapped by engaging with the protrusions 53h in order to further increase the overall height up to H4.

Figure 15A:
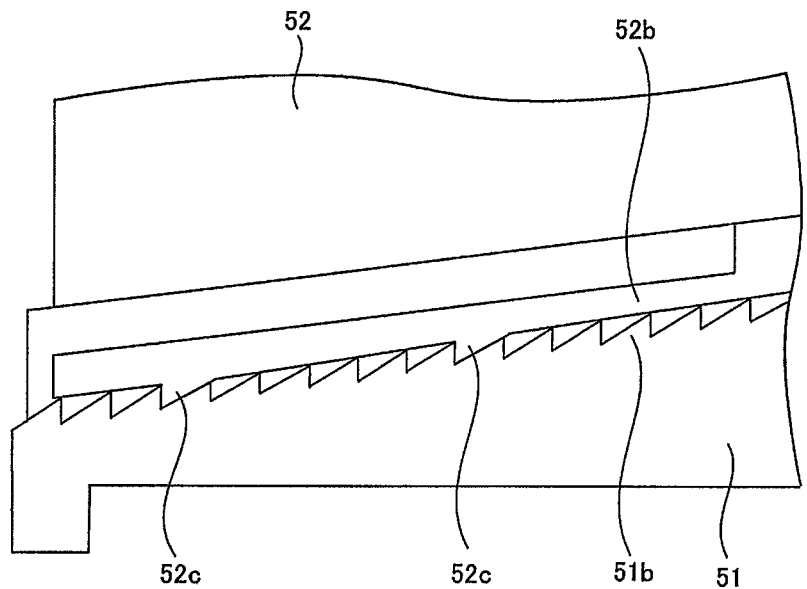
FIG. 15a is an illustrative view showing a state in which the latching teeth of the first and second wedge-shaped members are engaged with each other.
Figure 15B:
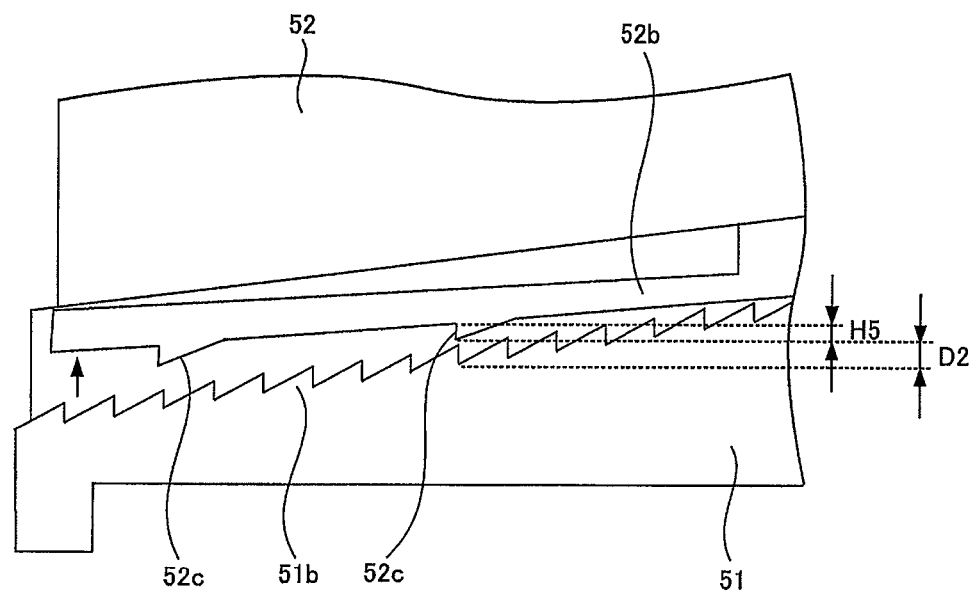
FIG. 15b is an illustrative view showing a state in which the latching teeth of the first and second wedge-shaped members are disengaged.
Figure 16:
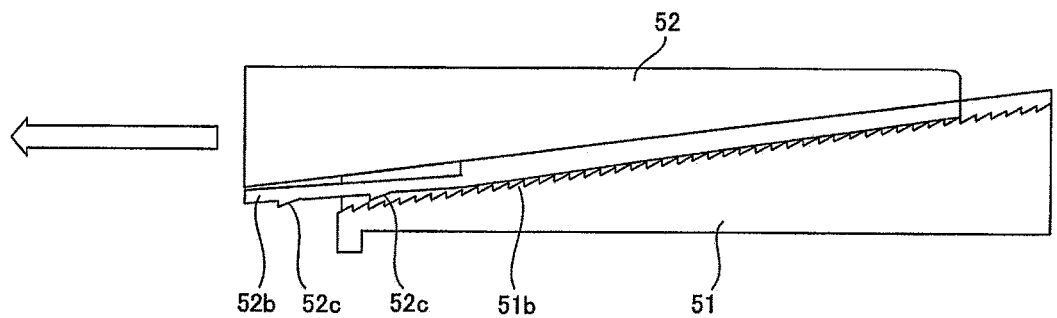
FIG. 16 is an illustrative view showing a state in which the second wedge-shaped member is moved in the reverse direction opposite the insertion direction.

In the present embodiment, it is possible to re-adjust the overall height of the spacer. FIG. 15a shows a state in which the latching teeth 51b of the wedge-shaped member 51 are in engagement with the latching teeth 52c of the wedge-shaped member 52. In this state, the elastic deformable member 52b of the wedge-shaped member 52 is elastically deformed upward by hand or tools so as to separate from the inclined surface of the wedge-shaped member 51, as shown in FIG. 15b. This enables both the latching teeth 51b and 52c to disengage and the wedge-shaped member 52 to be moved in the opposite direction, as shown in FIG. 16, thus allowing the overall height of the spacer to be reduced. In FIG. 15b, the movement distance D2 of the latching teeth 52c is preferably so set as to be greater than the height H5 of the latching teeth 52c.

The second wedge-shaped member 52 is repeatedly moved relative to the first wedged-shaped member 51 in the insertion or reverse direction until the spacer 50 reaches a desired height.

The positional adjustment using the spacer is performed at approximately every one meter for a plurality of pipe units 10. When the laying and position adjustment for the overall length of the rehabilitation pipe 40 is completed, supports (not shown) are installed in order to prevent deformation of the rehabilitation pipe 40. Subsequently, as shown in FIG. 6, the filler 30 such as cement mortar, epoxy resin, or polyester resin is injected using injection hoses 11 into the space between the existing pipe 21 and the rehabilitation pipe 40 through holes 11a formed in the rehabilitation pipe 40. The injected filler 30 can pass through the spacer 50 via the holes 51c and 52d of the wedge-shaped members 51 and 52.

Once the injected filler 30 hardens, a composite pipe is created that comprises the existing pipe 21, the rehabilitation pipe 40 and the filler 30.

In the embodiment described, it is also acceptable to vertically reverse the first and second wedge-shaped members 51 and 52, to fix the second wedge-shaped member 52 to the segment 1 and to move the first wedge-shaped member 51 relative to the second wedge-shaped member 52.

It is also acceptable in the embodiment described above to make the latching teeth pitch of the second wedge-shaped member 52 the same as that of the first wedge-shaped member 51.

It is also acceptable in the embodiment described above to form the protruding part 52a of the second wedge-shaped member 52 by an elastic body such as rubber and to provide the elastic body at the lower surface with the latching teeth 52c for engagement or disengagement with the latching teeth 51b of the first wedged-shaped member 51.

In the embodiment described above, the elastic deformable member 52b is provided to the second wedge-shaped member 52. However, instead of the elastic deformable member 52b, the second wedge-shaped member 52 may be provided with a vertically movable member having latching teeth that engage or disengage with the latching teeth 51b of the first wedge-shaped member 51 in accordance with vertical movement thereof.

What is claimed is:

1. A spacer insertable in a gap between an existing pipe and a rehabilitation pipe to adjust the position of the rehabilitation pipe inside the existing pipe, comprising:
    a first wedge-shaped member having an inclined surface provided with a guide groove having latching teeth thereon; and
    a second wedge-shaped member having a surface inclined at an angle the same as the inclination angle of the inclined surface of the first wedge-shaped member, the inclined surface of the second wedge-shaped member being provided with a protruding part that is fitted to the guide groove of the first wedge-shaped member when the first and second wedge-shaped members are overlapped;
    wherein the protruding part of the second wedge-shaped member is formed thinner at one end so as to be elastically deformable toward the inclined surface of the second wedge-shaped member to form an elastic deformable member;
    wherein the elastic deformable member has latching teeth that engage with the latching teeth of the first wedge-shaped member so as to make the second wedge-shaped member movable relative to the first wedge-shaped member in an insertion direction to stepwise increase an overall height of the spacer in the gap between the existing pipe and the rehabilitation pipe, but disabling movement of the second wedge-shaped member in a reverse direction opposite the insertion direction; and
    wherein, when the elastic deformable member is elastically deformed until the distal end thereof comes into contact with the inclined surface of the second wedge-shaped member, the latching teeth of the first and second wedge-shaped members are disengaged to enable movement of the second wedge-shaped member relative to the first wedge-shaped member in the reverse direction.

2. A method for adjusting the position of a rehabilitation pipe inside an existing pipe using a spacer according to claim 1, comprising:
    overlapping the first and second wedge-shaped members, with their latching teeth engaged, for insertion in the gap between the existing pipe and the rehabilitation pipe;
    pressing the second wedge-shaped member in the insertion direction to move it relative to the first wedge-shaped member to stepwise increase the overall height of the spacer; and
    disengaging the latching teeth of the first and second wedge-shaped members to enable reverse movement of the second wedge-shaped member for positional re-adjustment of the overall height of the spacer.

3. A method according to claim 2, wherein the second wedge-shaped member is repeatedly moved relative to the first wedged-shaped member in the insertion or reverse direction until the spacer reaches a desired height.

4. A spacer according to claim 1; further comprising a raising member attachable to a bottom side of the first wedge-shaped member for increasing the overall height of the spacer.

* * * * *